J. W. LEWELLEN.
WHEEL.
APPLICATION FILED JUNE 19, 1913.

1,157,559.

Patented Oct. 19, 1915.

Witnesses
William T. Mass
Will A. Burrows

Inventor
John Wisley Lewellen
by his Attorneys
Howson & Howson

UNITED STATES PATENT OFFICE.

JOHN W. LEWELLEN, OF RIDAL, PENNSYLVANIA.

WHEEL.

1,157,559.  Specification of Letters Patent.  Patented Oct. 19, 1915.

Application filed June 19, 1913.  Serial No. 774,706.

*To all whom it may concern:*

Be it known that I, JOHN W. LEWELLEN, a citizen of the United States, residing in Ridal, Montgomery county, State of Pennsylvania, have invented certain Improvements in Wheels, of which the following is a specification.

One object of my invention is to provide a novel combination of tire shoe and rim, particularly designed to permit of the easy and rapid removal or replacement of said shoe, the arrangement of parts being such that said invention may be conveniently applied to existing rims or may be adapted to specially made rims.

I further desire to provide a wheel having the above noted characteristics, which shall be simple, inexpensive and substantial in construction.

Another object of the invention is to provide a tire shoe of novel construction particularly adapted for use in connection with a novel form of rim and so designed that it may be quickly removed from or applied to such rim.

Figure 1:
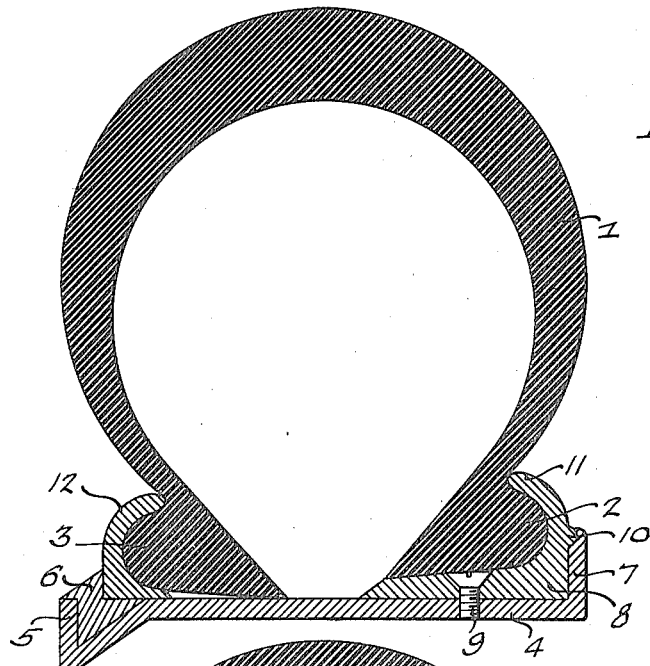
Figure 2:
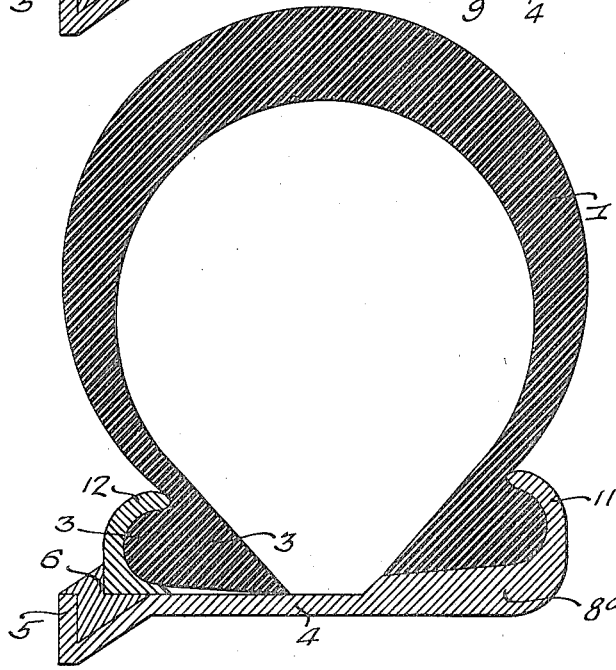

These objects and other advantageous ends I secure as hereinafter set forth, reference being had to the accompanying drawings, in which, Figure 1 is a vertical section of a tire shoe and rim constructed according to my invention; Fig. 2 is a vertical section of a slightly modified form of rim with the tire shoe applied thereto; and Fig. 3 is a fragmentary vertical section showing the invention as applied to another form of tire shoe and rim.

In Fig. 1 of the above drawings, 1 represents a tire shoe of the clencher type, which, however, is not bilaterally symmetrical. That is to say, in cross section, one of its sides is shorter than the other, so that its clencher portion 2 lies on a circle whose diameter is greater than the circle of the clencher portion 3 on its other side. Such a tire shoe or body is mounted on a rim 4 which may be of the well known construction except that its side opposite that having the retaining flange 5 and the locking ring 6 has a flange 7, there being in this case a structurally independent clencher ring 8 held from rotating relatively to the rim 4 by a series of screws of which one is shown at 9. It may also be held from rotating by a series of projections 10 designed to enter suitably formed notches in the edge or body of the flange 7, it being noted that this device may be employed either by itself or in connection with the holding screws 9. This independent clencher ring 8 is provided with an inturned holding flange 11 designed to receive the clencher portion 2 of the tire shoe, and when the various parts are assembled, said portion is supported by the ring 8 at a definite distance above the cylindrical surface of the rim 4. The clencher part 3 of the other side of the shoe 1 rests upon the cylindrical surface of the rim 4, in the customary manner and is held in place by an inwardly flanged retaining ring 12 locked in position by the ring 6 in the well known manner.

Under conditions of use, when it is desired to remove a tire shoe of the ordinary construction from a cylindrical rim, it is usual, and in fact necessary, to first slide the part 3 of the shoe laterally off of the rim at a point thereof 180° distant from the valve stem of the tire. While comparatively little difficulty is experienced in freeing the clencher portion 3 from the part of the rim on which it is mounted, it has hitherto been extremely difficult to similarly remove the other clencher portion, for the reason that its diameter is insufficient to permit of its easy passage over the edge of the rim when it is swung from a point adjacent the valve on the opposite side of said rim as a center of movement. With my invention, however, the removal of the locking ring 6 and the clencher ring 12 permits the clencher portion 3 of the tire shoe being easily and quickly moved laterally off of the rim and thereafter, even though the part 2 of the tire shoe be swung laterally from a point on the opposite side of the rim as a center, it is free to easily pass over that part of said rim most distant from the valve stem, since its first sidewise movement frees this clencher part 2 from the flanged ring 8, and its diameter is such that it altogether clears or barely contacts with the opposite edge of said rim. The construction shown in Fig. 1 is particularly adapted for the application of my invention to rims of a well known type already in use, since obviously it is merely necessary to apply to such a rim, the independent flanged clencher ring 8. In some cases, however, the rim may be made as shown in Fig. 2, with the part 8 integral with its body $4^b$, in which instance the said rim, instead of having a cylindrical external surface, has that portion, opposite the flange 5 for the locking ring, made of larger external diameter than the remainder as indicated at 8ª, and tapered from the base of the inwardly curved clencher flange 11 toward the central plane of the rim. The tire shoe 1, however, is of the same construction as that shown in Fig. 1 and is designed to be removed from or applied to the rim as above described.

Figure 3:
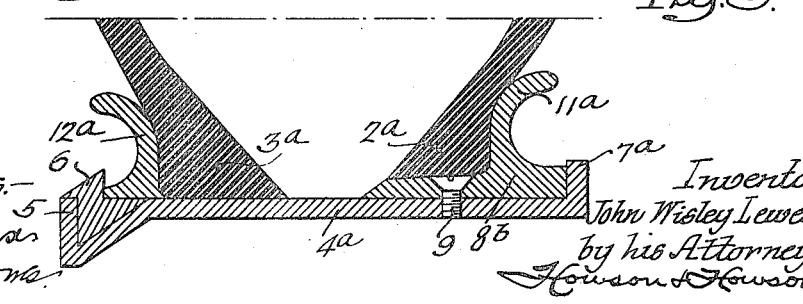

In Fig. 3 I have illustrated another well known form of rim to which my invention has been applied and in this case I employ a ring 8ᵇ having an outwardly curved flange 11ª held from rotating relatively to the rim 4ª by a suitable number of screws 9 and prevented from lateral outward displacement by an edge flange 7ª. This ring 8ᵇ as before has a portion, whose outer surface is inclined from its flange 11ª toward the central plane of the ring, for the reception of the enlarged edge 2ª of the tire shoe, which as in the case of Figs. 1 and 2, is of greater internal diameter than is the second edge 3ª. This latter edge also rests upon or is supported by, the cylindrical exterior surface of the rim. The shoe as a whole is retained in place on the rim by a removable outwardly curved flange 12ª and a locking ring 6. This construction, like those hitherto described, permits that portion of the tire shoe 180 degrees distant from the part adjacent to the valve, to be moved laterally of the rim so as to free it from the same without allowing the binding of either or both of the inner portions of said shoe upon the edge of the rim.

While I have described my invention as applied to a tire shoe it is to be understood that it is immaterial whether the structure carried by the rim and made of greater internal diameter at one side than at the other, is technically a shoe or is a single tube or a solid annular tire, since said invention is equally applicable to any or all of these devices and to their supporting structure.

I claim:—

1. The combination of a rim; a relatively fixed flange adjacent one side thereof; a removable flange adjacent the other side of the rim, there being a conical shoe-receiving surface extending toward the central plane of the rim from the fixed flange and a cylindrical shoe-receiving surface extending toward the middle of the rim from the removable flange; with a tire shoe having one of its inner edges formed to fit the conical surface and its other inner edge formed to fit said cylindrical surface.

2. The combination of a rim having two portions of different external diameters of which one has a cylindrical external surface and the other has a conical external surface; with a tire shoe having the interior surfaces of its two edges also of different diameters and formed to fit the external surfaces of said two rim portions respectively.

3. The combination of a rim having a tire retaining flange at one edge and formed with a part of its external surface tapering from said flange to its middle portion, the balance of said surface being cylindrical; a tire shoe mounted on said rim and having one portion of enlarged internal diameter to engage said tapering portion of the rim, while its remaining portion is formed to engage the cylindrical portion of the rim; with means for removably holding the shoe on the rim.

In testimony whereof, I have signed my name to this specification, in the presence of two subscribing witnesses.

JOHN W. LEWELLEN.

Witnesses:
   William E. Bradley,
   Wm. A. Barr.